(12) United States Patent
Toyoda et al.

(10) Patent No.: US 7,195,576 B2
(45) Date of Patent: Mar. 27, 2007

(54) CONTINUOUSLY VARIABLE TRANSMISSION APPARATUS (75) Inventors: Toshirou Toyoda, Kanagawa (JP); Shinji Miyata, Kanagawa (JP); Hidekazu Watanabe, Saitama (JP)

(73) Assignee: NSK Ltd., Tokyo (JP)

( * ) Notice: Subject to any disclaimer, the term of this patent is extended or adjusted under 35 U.S.C. 154(b) by 332 days.

(21) Appl. No.: 10/773,443

(22) Filed: Feb. 9, 2004

(65) Prior Publication Data

US 2004/0248690 A1    Dec. 9, 2004

(30) Foreign Application Priority Data

Feb. 10, 2003    (JP)    ............ P.2003-032113

(51) Int. Cl.
*F16H 37/02*    (2006.01)
(52) U.S. Cl. ................... 475/216; 475/218
(58) Field of Classification Search ............ 475/214–6, 475/218–9, 331
See application file for complete search history.

(56) References Cited

U.S. PATENT DOCUMENTS

| | | | |
|---|---|---|---|
| 5,033,322 A | | 7/1991 | Nakano |
| 5,569,112 A | | 10/1996 | Fukushima |
| 5,607,372 A | * | 3/1997 | Lohr ............... 475/216 |
| 6,099,431 A | | 8/2000 | Hoge et al. |
| 6,213,907 B1 | * | 4/2001 | Wooden ............ 475/216 |
| 6,251,039 B1 | | 6/2001 | Koga |
| 6,375,595 B1 | | 4/2002 | Machida et al. |
| 6,422,966 B1 | * | 7/2002 | Haka ............... 475/216 |
| 6,752,735 B2 | * | 6/2004 | Ishikawa et al. ..... 475/216 |
| 6,855,086 B2 | * | 2/2005 | Elser et al. ......... 475/214 |
| 6,872,162 B2 | * | 3/2005 | Inoue et al. ........ 475/216 |
| 7,014,588 B2 | * | 3/2006 | Miyata et al. ....... 475/214 |
| 2003/0036454 A1 | | 2/2003 | Miyata et al. |

FOREIGN PATENT DOCUMENTS

| | | |
|---|---|---|
| DE | 102 37 487 A1 | 4/2003 |
| DE | 102 06 202 A1 | 8/2003 |
| JP | 2002-174313 A | 6/2002 |

* cited by examiner

*Primary Examiner*—Roger Pang
(74) *Attorney, Agent, or Firm*—Sughrue Mion, PLLC (57) ABSTRACT A continuously variable transmission apparatus coupled to a drive source has an input shaft, an output shaft, a toroidal-type continuously variable transmission having a pair of input side disks an output side disk, a trunnion, a support shaft and a power roller, and the planetary gear mechanism having a sun gear, a ring gear, a carrier and a planetary gear, wherein a plurality of projections are projected from the one input side disk and provided at positions closer to the outside diameter than to the diameter of a pitch circle of a traction section being close to the outermost diameter of the input side disk, a plurality of engagement sections formed in the carrier, and transmission of power between the carrier and the one input side disk is carried out by coupling the plurality of projections with the plurality of engagement sections.

3 Claims, 8 Drawing Sheets

CONTINUOUSLY VARIABLE TRANSMISSION APPARATUS

BACKGROUND OF THE INVENTION

1. Field of the Invention

A continuously variable transmission apparatus according to the present invention is utilized as an automatic transmission for use with an automobile.

2. Description of the Related Art

A toroidal-type continuously variable transmission apparatus has already been known as a kind of transmission constituting a transmission for use with an automobile. Such a toroidal-type continuously variable transmission apparatus that has already been put into practice in some applications in the aforementioned manner is of so-called double cavity type, wherein power is transmitted from an input section to an output section by way of two separate systems provided in parallel with each other. Toroidal-type continuously variable transmission apparatus described in U.S. Pat. No. 5,033,322 and U.S. Pat. No. 5,569,112 and those described in numerous other publications have already been known as examples of such a toroidal-type continuously variable transmission apparatus. A basic structure of the toroidal-type continuously variable transmission apparatus will be described by reference to FIG. 8.

Figure 8:
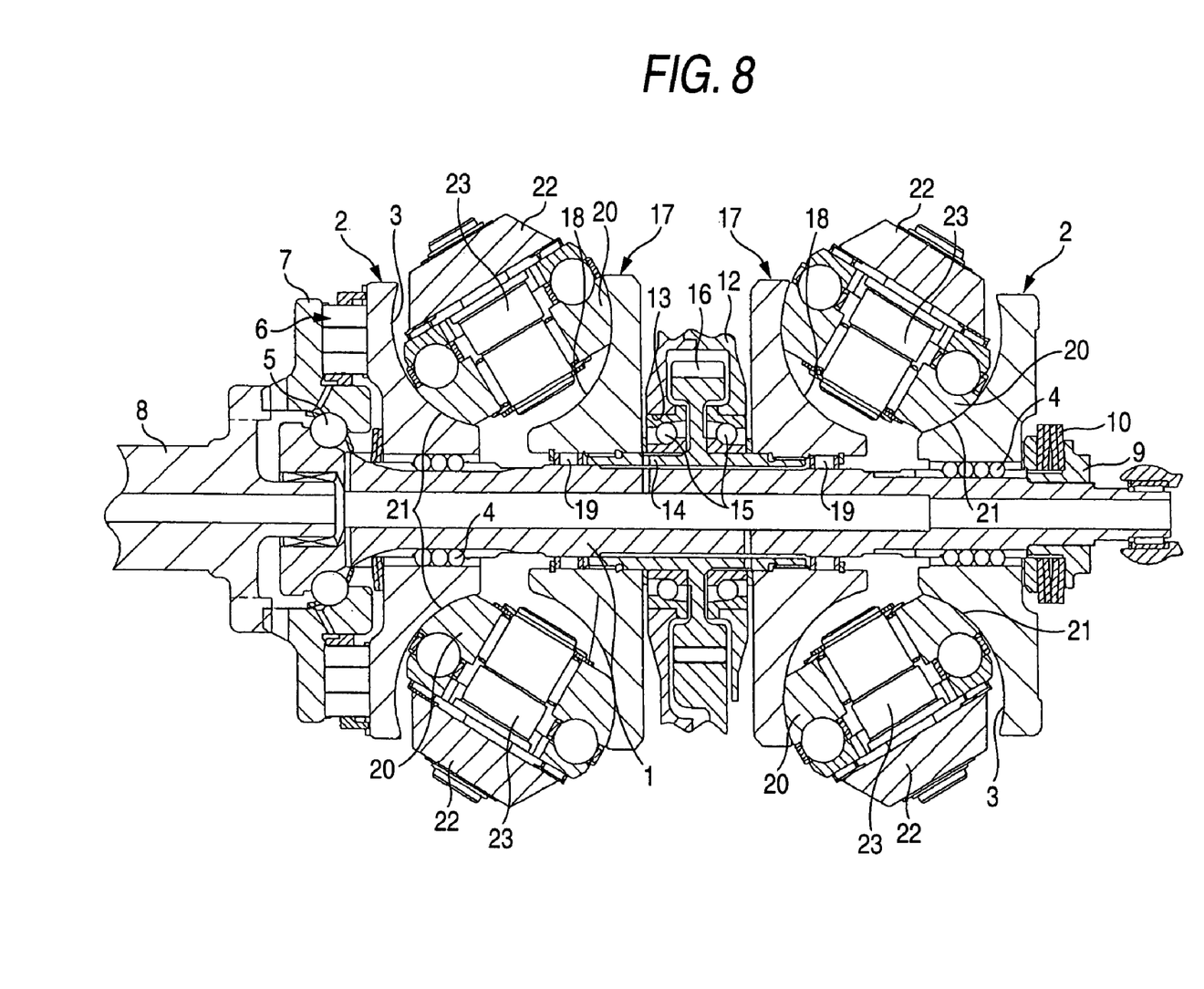
FIG. 8 is a side view showing an example of a conventionally-known toroidal-type continuously variable transmission when it is in the state of maximum deceleration.

The toroidal-type continuously variable transmission apparatus shown in FIG. 8 has an input shaft 1. Input side disks 2, 2 are provided at respective areas close to a base end section (i.e., a left-side portion in FIG. 8) and an extremity section (i.e., a right-side portion in FIG. 8) of the intermediate section of the input shaft 1. The input side disks 2, 2 support ball splines 4, 4 such that input side surfaces 3, 3 consisting of toroidal surfaces are mutually opposed with respect to the input shaft 1. Therefore, the input side disks 2, 2 are supported so as to rotate in synchronism with the input shaft 1 such that the input side disks 2, 2 can be displaced in the axial direction of the input shaft 1.

A rolling bearing 5 and a pressing apparatus 6 of loading cam type are interposed between a base end section (the left end section shown in FIG. 8) of the input shaft 1 and an exterior surface of the input side disk 2. A cam plate 7 constituting the pressing apparatus 6 is set so that the cam plate can be rotatably driven by a drive shaft 8. On the other hand, a loading nut 9 and a flat leaf spring 10 having great resiliency are interposed between the extremity (the right end shown in FIG. 8) of the input shaft 1 and an outer side surface of the other input side disk 2.

Figure 1:
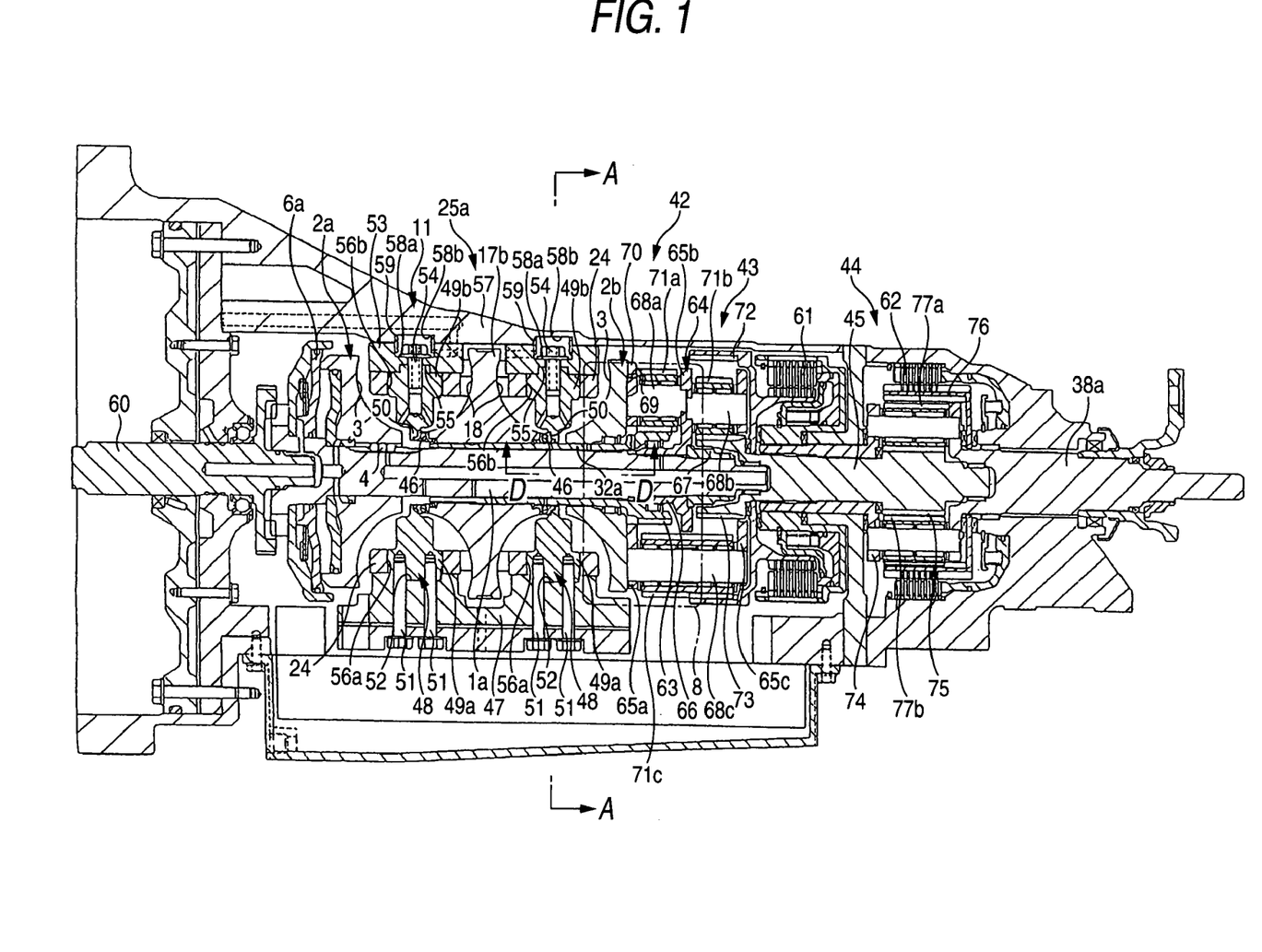
FIG. 1 is a cross-sectional view showing one example of an embodiment of the present invention.

An intermediate section of the input shaft 1 penetrates through a through hole 13 formed in a partition section 12 provided within a casing 11 housing the toroidal-type continuously variable transmission apparatus (see FIG. 1 showing an embodiment of the present invention). A cylindrical output cylinder 14 is rotatably supported by a pair of rolling bearings 15, 15 on an internal diameter side of the through hole 13. An output gear 16 is fixedly fitted around an outer periphery of the intermediate section of the output cylinder 14. A pair of output side disks 17, 17 are provided on the respective ends of the output cylinder 14 which protrude from outside surfaces of the partition section 12 and are supported so as to rotate in synchronism with the output cylinder 14 by means of spline engagement. In addition, a structure for rotatably coupling the pair of output side disks to both ends of the output cylinder and a structure for coupling inside-diameter portions of the outside surfaces of the output side disks to end sections of a sleeve by means of irregularity engagement, as described in U.S. Pat. No. 6,375,595, which is an another case being different from the above described means of spline engagement, have already been known as structures for rotatably coupling the pair of output side disks to the respective end sections of the output cylinder.

In this state, output side surfaces 18, 18 of the output side disks 17, 17, the side surfaces consisting of toroidal surfaces, oppose the input side surfaces 3, 3. Alternatively, needle roller bearings 19, 19 are interposed between some portions of inner peripheral surfaces of the output side disks 17, 17 protruding from the edge of the output cylinder 14 and an outer peripheral surface of the intermediate section of the input shaft 1. And, rotation and axial fluctuations of the output side disks 17, 17 with respect to the input shaft 1 are made variable while the load exerted on the output side disks 17, 17 is supported.

And, a plurality of power rollers 20, 20 (in general, two or three) are provided in a space (cavity) defined between the input and output side surfaces 3 and 18 around the input shaft 1. Each of the power rollers 20, 20 has a circumferential surface 21 which is brought into contact with the input and output side surfaces 3, 18 and formed into a spherical protruding surface. The power roller 20 is supported on an inner side of a trunnion 22 by means of a support shaft 23 and a plurality of roller bearings so as to be rotatable and slightly swingable.

Figure 2:
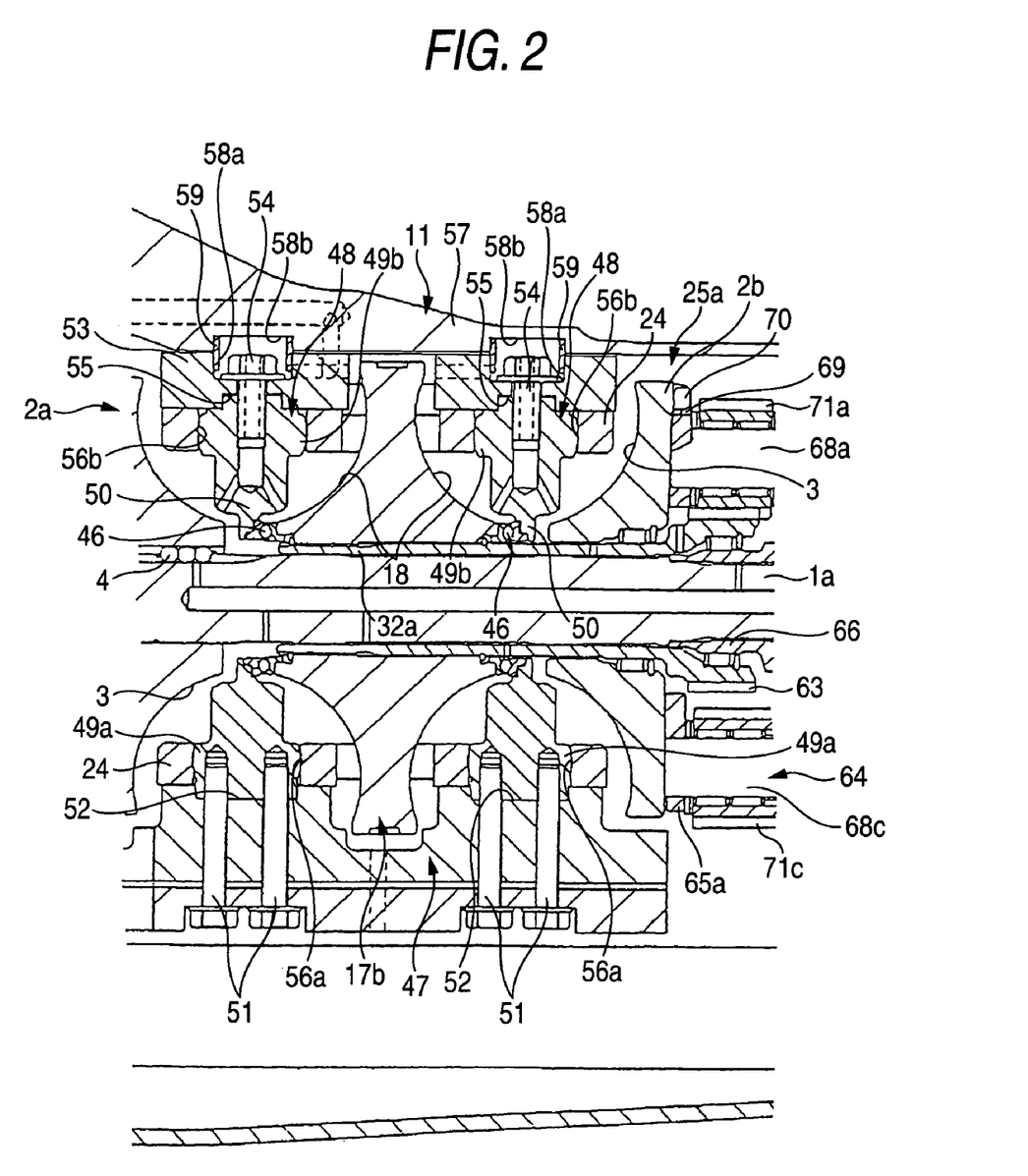
FIG. 2 is an enlarged view of the center of FIG. 1.
Figure 3:
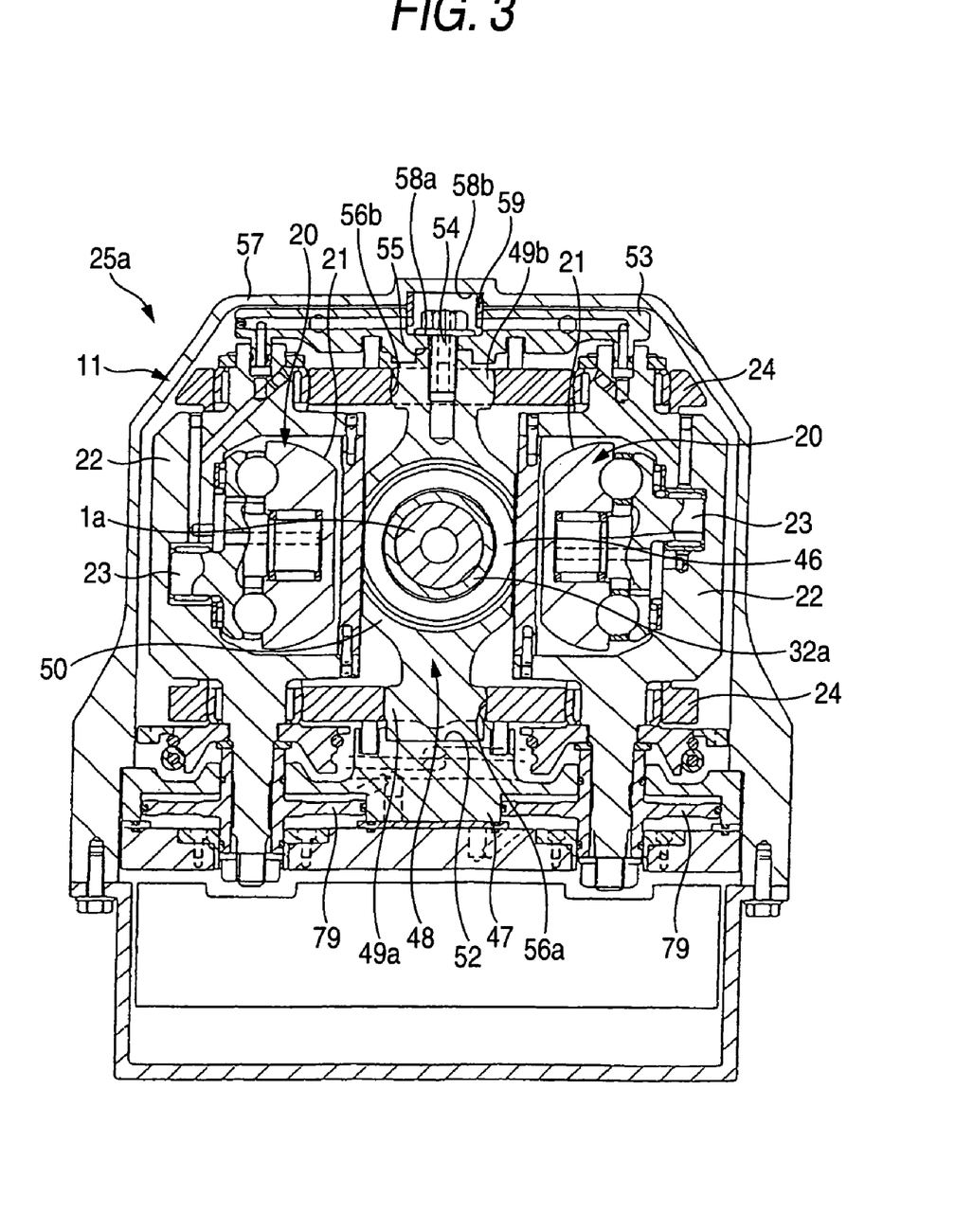
FIG. 3 is an enlarged cross-sectional view taken along line A—A shown in FIG. 1.

Further, the trunnion 22 supports an axle provided on both ends thereof (i.e., with respect to a direction from the front side to the rear side of FIG. 8) on a support plate 24 (see FIGS. 1 through 3 showing an embodiment of the present invention) provided within the casing 11 such that the axle is swingable and displaceable in the axial direction. The trunnion 22 supports the axle such that the axle becomes freely movable in a counterclockwise direction and a clockwise direction in FIG. 8 and is displaced in the axial direction of the axle (i.e., the vertical direction in FIG. 1 and the direction from the front side to the rear side of FIG. 8) by means of an unillustrated actuator.

When the toroidal-type continuously variable transmission apparatus having the foregoing construction is driven, the input side disk 2 is rotatably driven by way of the pressing apparatus 6 by means of the drive shaft 8. The pressing apparatus 6 rotatably drives the input side disk 2 while generating axial thrust. The pair of input side disks 2, 2 including that input side disk 2 are rotated synchronously while being pressed against the respective output side disks 17, 17. Consequently, rotation of the input side disks 2, 2 is transmitted to the respective output side disks 17, 17 by way of the respective power rollers 20, 20. The output gear 16 coupled to the respective output side disks 17, 17 is rotated by way of the output cylinder 14.

When a transmission ratio between the drive shaft 8 and the output gear 16 is changed, the trunnions 22, 22 are displaced in the direction from the front side to the rear side of FIG. 8 by means of an unillustrated actuator. In this case, the trunnions 22, 22 of an upper half section in FIG. 8 and the trunnions 22, 22 in a lower half section in FIG. 8 are displaced in opposite directions to the same extent. An aspect of the force applied, in a tangential direction, to a contact section between the circumferential surfaces 21, 21 of the power roller 20 and the input and output side surfaces 3, 18 is changed in association with such a displacement. By means of the force in the tangential direction, the trunnions 22, 22 are swung around the axles provided on the respective end sections thereof.

In association with the swinging action, the positions of the contact sections between the circumferential surfaces 21, 21 of the power roller 20 and the input and output side surfaces 3, 18 are changed with respect to the radial directions of the side surfaces 3, 18. As the contact sections change toward the outside with respect to the radial direction of the input side surface 3 and the inside with respect to the radial direction of the output side surface 18, the transmission ratio is changed to acceleration. On the other hand, as the contact section changes toward the inside with respect to the radial direction of the input side surface 3 and the outside with respect to the radial direction of the output side surface 18, the transmission ratio is changed to deceleration.

Figure 9:
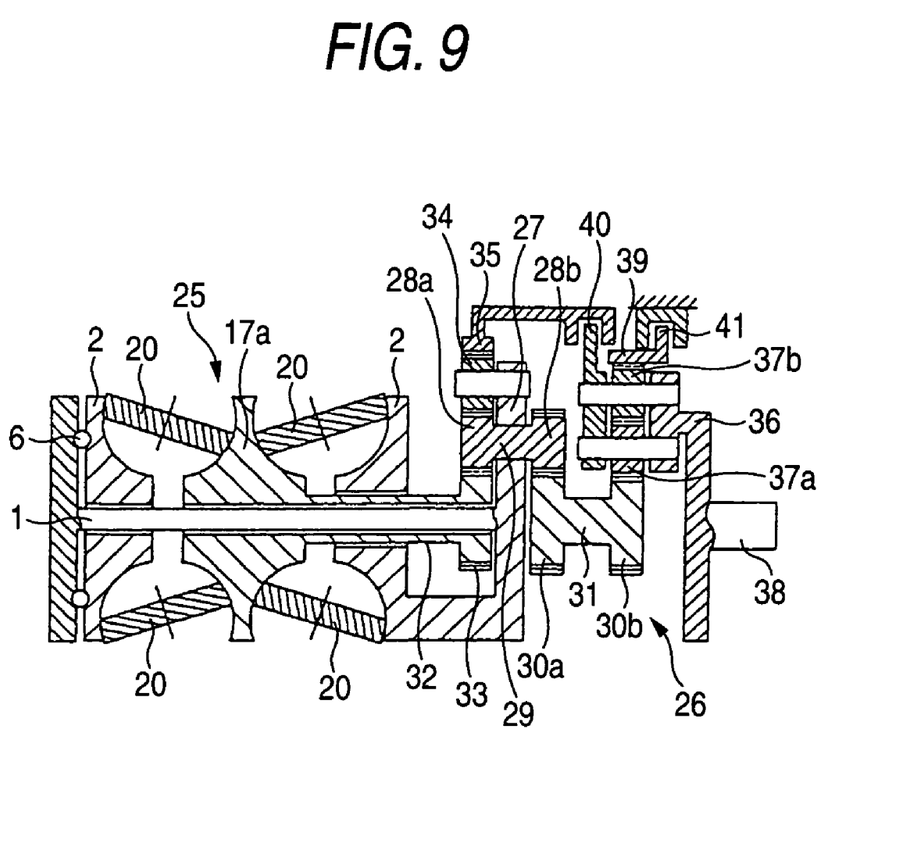
FIG. 9 is an essentially-cross-sectional view showing an example of a conventionally-known continuously variable transmission apparatus.

For the case where the toroidal-type continuously variable transmission apparatus that is constructed and operates in the aforementioned manner is built in an actual automobile, construction of a continuously variable transmission apparatus by combination of the variable-speed drive with a differential unit of gear type, such as a planetary gear mechanism, has already been proposed. FIG. 9 shows a continuously variable transmission apparatus described in U.S. Pat. No. 6,251,039 from among the continuously variable transmission apparatus which have already been proposed. This continuously variable transmission apparatus is of a so-called geared neutral type, wherein rotation of an output shaft can be switched between forward rotation and rearward rotation with a stop therebetween while the input shaft is being rotated in one direction. The continuously variable transmission apparatus is constructed by combination of a toroidal-type continuously variable transmission 25 with a planetary gear mechanism 26. Of these transmissions, the toroidal-type continuously variable transmission 25 comprises the input shaft 1; the pair of input side disks 2, 2; an output side disk 17a; and the plurality of power rollers 20, 20. In the illustrated example, the output side disk 17a has a structure in which a pair of output side disks are integrated together by means of abutting the outer surfaces of the disks against each other.

The planetary gear mechanism 26 comprises the input shaft 1, and a carrier 27 fixedly coupled to one input side disk 2 (i.e., the right input side disk shown in FIG. 9). A first transmission shaft 29 having planetary gears 28a, 28b secured on respective ends of the shaft is rotatably supported by an intermediate portion of the carrier 27 in the radial direction thereof. A second transmission shaft 31 having sun gears 30a, 30b secured on respective ends thereof is rotatably supported in a manner concentric with the input shaft 1 on the side opposite the input shaft 1 with the carrier 27 sandwiched therebetween. The planetary gears 28a, 28b are engaged with a sun gear 33 fixed to the extremity (i.e., the right end section in FIG. 9) of a hollow rotary shaft 32 whose base end section (i.e., the left end section in FIG. 9) is coupled to the output side disk 17a, or with the sun gear 30a fixed to one end section (i.e. the left end section in FIG. 9) of the second transmission shaft 31. One of the planetary gears 28a (i.e., the left planetary gear 28a shown in FIG. 9) is engaged with a ring gear 35 rotatably provided around the carrier 27 by way of the other planetary gear 34.

On the other hand, Planetary gears 37a, 37b are rotatably supported on a second carrier 36 provided around the sun gear 30b fixed to the other end section (i.e., the right end section in FIG. 9) of the second transmission shaft 31. The second carrier 36 is fixed to the base end section (i.e., the left end section in FIG. 9) of the output shaft 38 disposed concentrically with the input shaft 1 and the second transmission shaft 31. The planetary gears 37a, 37b engage with each other, and the planetary gear 37a is engaged with the sun gear 30b, and the other planetary gear 37b is engaged with a second ring gear 39 rotatably provided around the second carrier 36. The ring gear 35 and the second carrier 36 are removably engaged with a low-speed clutch 40, and the second ring gear 39 and a stationary portion of a housing are removably engaged with a high-speed clutch 41.

In the case of the continuously variable transmission apparatus shown in FIG. 9 such as that described previously, the power of the input shaft 1 is transmitted to the output shaft 38 by way of the ring gear 35 in a so-called low-speed mode in which the low speed clutch 40 is connected and the high-speed clutch 41 is disconnected. The transmission ratio of the entire continuously variable transmission apparatus; that is, a transmission ratio of the input shaft 1 to the output shaft 38, is changed by means of changing the transmission ratio of the toroidal-type continuously variable transmission 25. In such a low-speed mode, the transmission ratio of the entire continuously variable transmission apparatus is changed infinitely. Specifically, the rotation of the output shaft 38 can be switched between forward and rearward with a stop therebetween while the input shaft 1 is rotated in one direction, by means of adjusting the transmission ratio of the toroidal-type continuously variable transmission 25.

During acceleration or constant-speed traveling of the automobile in such a low-speed mode, the torque (i.e., passing torque) that has passed through the toroidal-type continuously variable transmission 25 is applied to the output side disk 17a from the input shaft 1 by way of the carrier 27, the first transmission shaft 29, the sun gear 33, and the hollow rotary shaft 32. The torque is further applied from the output side disk 17a to the input side disks 2, 2 by way of the power rollers 20, 20. Specifically, the torque passing through the toroidal-type continuously variable transmission 25 during acceleration or constant-speed driving is circulated in the direction in which the input side disks 2, 2 experience the torque output from the power rollers 20, 20.

On the other hand, in a so-called high-speed mode in which the low-speed clutch 40 is disconnected and the high-speed clutch 41 is connected, the power of the input shaft 1 is transmitted to the output shaft 38 by way of the first and second transmission shafts 29, 31. The transmission ratio of the entire continuously variable transmission apparatus is changed by means of changing the transmission ratio of the toroidal-type continuously variable transmission 25. In this case, the higher the transmission ratio of the toroidal-type continuously variable transmission 25, the higher the transmission ratio of the entire continuously variable transmission apparatus.

During acceleration or constant-speed driving in such a high-speed mode, the torque having passed through the toroidal-type continuously variable transmission 25 is applied in the direction in which the input side disks 2, 2 apply torque to the power rollers 20, 20.

U.S. Pat. No. 6,251,039 describing the continuously variable transmission apparatus such as that mentioned above discloses only the principle of the speed-variable drive but fails to disclose a specific structure. On the other hand, when the continuously variable transmission apparatus is embodied, a contrivance must be applied to a structure of a coupling section between one input side disk 2 constituting the toroidal-type continuously variable transmission 25 and the carrier 27 constituting the planetary gear mechanism 26. Specifically, as shown in FIG. 9, in the case of a continuously variable transmission apparatus of a so-called geared neutral type, when the output shaft 38 is stopped or rotated at a very low speed while the input shaft 1 is being rotated, the torque passing through (circulating) the toroidal-type continuously variable transmission 25 becomes extremely large. Accordingly, the coupling section must possess sufficient strength to transmit such large torque.

SUMMARY OF THE INVENTION

A continuously variable transmission apparatus of the present invention has been conceived in light of the circumstances.

Accordingly, the present invention provides a continuously variable transmission apparatus coupled to a drive source comprising: an input shaft rotatably driven by the drive source; an output shaft for extracting power derived from rotation of the input shaft; and a toroidal-type continuously variable transmission and a planetary gear mechanism disposed between the input shaft and the output shaft, wherein the toroidal-type continuously variable transmission has: a pair of input side disks, each having inner and outer side surfaces and rotating together with the input shaft; an output side disk having side surfaces, the side surface being disposed concentrically with the respective input side disks around an intermediate section of the input shaft and being opposite to the inner side surfaces of the respective input side disks, and the output side disk being rotatable independently of the input side-disks; a trunnion interposed between the input side disk and the output side disk and swinging around an axle twisted with respect to center axles of the disks; a support shaft protruding from an inner side surface of the trunnion; and a power roller interposed between the input-side disk and the output side disk while being rotatably supported by the support shaft; and the planetary gear mechanism has a sun gear; a ring gear disposed around the sun gear; a carrier supported concentrically with the sun gear and supported on one end section of the input shaft; and a planetary gear interposed between the sun gear and the ring gear, rotatably supported by the carrier and engaged with the sun gear and the ring gear; and wherein a plurality of projections are projected from a portion of the outer side surface of the one input side disk and provided at positions closer to the outside diameter than to the diameter of a pitch circle of a traction section, the traction section being a rolling contact section between the inner side surface of the input side disk and a circumferential surface of the power roller and located areas close to the outermost diameter of an inside surface of the input side disk, a plurality of engagement sections formed in a part of the carrier, and transmission of power between the carrier and the one input side disk is carried out by coupling the plurality of projections with the plurality of engagement sections.

It is preferable that the plurality of projections may be provided radially outside than a circumscribed circle of a contact oval existing in the traction section.

It is also preferable that the continuously variable transmission apparatus may achieve the state of an infinite transmission ratio by stopping the output shaft while the input shaft is rotated.

The continuously variable transmission apparatus of the present invention having the foregoing construction transmits power between the input shaft and the output shaft. The basic operation required when a transmission ratio of the input shaft to the output shaft is changed is the same as that adopted in the case of the conventionally-known continuously variable transmission apparatus shown in FIG. 9.

Particularly, in the case of the continuously variable transmission apparatus of the present invention, a plurality of protuberances projectingly provided on a portion of an outer surface of one input side disk are engaged with a plurality of engagement sections formed on a part of the carrier. Large torque can be transmitted between the carrier and the one disk.

However, the respective protuberances are provided at positions closer to the outside diameter than to the diameter of a pitch circle of a traction section. The stress applied to one input side disk during transmission of torque is suppressed to a low level, thereby sufficiently ensuring durability of respective constituent members including the input side disk.

DETAILED DESCRIPTION OF THE PREFERRED EMBODIMENTS

FIGS. 1 through 7 show an embodiment of the present invention. In the drawings, dimensional relationships, such as aspect ratios, are shown in an actual scale. A continuously variable transmission apparatus of the present embodiment is constituted by combination of a toroidal-type continuously variable transmission 25a and first through third planetary gear mechanisms 42 to 44 and has an input shaft 1a and an output shaft 38a. Of these elements, first and second planetary gear mechanisms 42, 43 correspond to planetary gear mechanisms. In the illustrated embodiment, a transmission shaft 45 is provided concentrically with and between the input shaft 1a and the output shaft 38a such that the transmission shaft 45 is rotatable relative to the shafts 1a and 38a. The first and second planetary gear mechanisms 42, 43 are provided so as to bridge the input shaft 1a and the transmission shaft 45, and the third planetary gear mechanism 44 is provided so as to bridge the transmission shaft 45 and the output shaft 38a.

Of these elements, the toroidal-type continuously variable transmission 25a comprises a pair of input side-disks 2a, 2b; an integrated output side disk 17b; and a plurality of power rollers 20, 20. The pair of input side disks 2a, 2b are coupled concentrically with each other by way of the input shaft 1a so as to be able to rotate synchronously. The output side disk 17b is interposed between the input side disks 2a, 2b concentrically therewith and supported such that the output side disk 17b is rotatable relative to the input side disks 2a, 2b. Moreover, the plurality of power rollers 20, 20 are sandwiched between the axial side surfaces of the output side disk 17b and single-axial-side surfaces of the input side disks 2a, 2b. By means of the rotation of the power rollers together with the input side disks 2a, 2b, the power is transmitted from the input side disks 2a, 2b to the output side disk 17b.

In the case of the present embodiment, both axial end sections of the output side disk 17b are rotatably supported by rolling bearings, such as a-pair of thrust angular ball bearings 46, 46. Therefore, in the case of the present embodiment, a pair of supports 48, 48 are provided in a casing 11 by way of an actuator body 47 in order to support a pair of support plates 24, 24 intended for supporting both end sections of the respective trunnions 22, 22. Each of the supports 48, 48 is constituted by coupling together a pair of support post sections 49a, 49b which are provided on both sides with reference to the input shaft 1a in a concentric manner, by means of an annular support ring section 50. The input shaft 1a is inserted into the support ring section 50.

Lower end sections of the respective supports 48, 48 are fixedly coupled to an upper surface of the actuator body 47 with a plurality of bolts 51, 51 while limitations are imposed on the position and direction in which the supports are to be mounted. Therefore, recessed sections 52, 52 to be used for receiving the lower end sections of the respective supports 48, 48 without rattle are formed in the upper surface of the actuator body 47. A plurality of screw holes are opened in the lower end faces of the respective lower end sections of the supports 48, 48. The respective supports 48, 48 are fixed at predetermined positions on the upper surface of the actuator body 47, by means of inserting the lower end sections of the supports 48, 48 into the actuator body 47 from below and screw-engaging the lower end sections with the respective recessed sections 52, 52 while the lower end sections of the supports 48, 48 are fitted into the inside of the respective recessed sections 52, 52, and fastening the lower end sections through use of the bolts 51, 51.

On the other hand, upper end sections of the respective supports 48, 48 are fixedly coupled to a lower surface of a coupling plate 53 by means of bolts 54, 54 while limitations are imposed on the mount positions of the upper end sections. Therefore, recessed sections 55, 55 to be used for receiving the upper end sections of the respective supports 48, 48 without rattle are formed in the lower surface of the coupling plate 53. One thread hole is formed in the center of the upper end surface of each of the support sections 48, 48. The respective supports 48, 48 are fixed at predetermined positions on the lower surface of the coupling plate 53, by means of inserting the upper end sections of the supports 48, 48 into the coupling plate 53 from above and screw-engaging the upper end sections with the respective thread holes while the upper end sections of the supports 48, 48 are fitted into the inside of the respective recessed sections 55, 55, and fastening the upper end sections through use of the bolts 54, 54.

As mentioned above, the pair of supports 48, 48 are fixedly coupled between the upper surface of the actuator body 47 and the lower surface of the coupling plate 53 so as to bridge them while imposing limitations on the positions of the supports. In this state, of the support post sections 49a, 49b provided in the vicinity of respective end sections of the respective supports 48, 48, the lower support post sections 49a, 49a are located at positions immediately above the upper surface of the actuator body 47. Support holes 56a, 56a formed in the lower support plate 24 of the pair of support plates 24, 24 are fitted around the support post sections 49, 49a of the supports 48, 48 without rattle. The upper support post sections 49, 49b are located at positions immediately below the lower surface of the coupling plate 53. Support holes 56, 56b formed in the upper support plate 24 of the pair of support plates 24, 24 are fitted around support post sections 49, 49b of the supports 48, 48 without rattle. The power rollers 20, 20 are rotatably supported between the support plates 24, 24, which have been provided in the aforementioned manner, by way of a plurality of trunnions 22, 22 and support shafts 23, 23. A circumferential surface 21 of each power roller 20 is brought into rolling contact with an input side surface 3 of the input side disk 29 and an output side surface of the output side disk 17b.

Of the actuator body 47 and the coupling plate 53 coupled together by means of the pair of supports 48, 48, the actuator body 47 is fixedly supported below the casing 11 while limitations are imposed on the lengthwise and widthwise positions of the actuator body 47 (i.e., the horizontal direction in FIGS. 1 and 2 and the direction from the front to rear side of FIG. 3), and the coupling plate 53 is fixedly supported within the casing 11 while limitations are imposed on the lengthwise and widthwise positions of the coupling plate 53 (i.e., the horizontal direction in FIGS. 1 and 2 and the direction from the front to rear side of FIG. 3). In the illustrated embodiment, cylindrical positioning sleeves 59, 59 are provided so as to bridge positioning recessed sections 58a, 58b formed in portions of the upper surface of the coupling plate 53 and portions of the lower surface of a ceiling section 57 of the casing 11, the portions opposing each other. The coupling plate 53 is positioned through use of a plurality of unillustrated positioning pins.

In this way, the support ring sections 50, 50 are present in the centers of the respective cavities (spaces) which are located between the pair of supports 48, 48 fixed to predetermined positions within the casing 11 and defined between the input side disks 2a, 2b and the output side disk 17b. By means of the support ring sections 50, 50, the output side disk 17b is rotatably supported. Therefore, the thrust angular ball bearings 46, 46 are provided between the respective support rings 50, 50 and both axial end surfaces of the output side disk 17b; that is, locations closer to the inner diameter than to the output side surfaces (side surfaces) 18, 18 provided on both axial side surfaces of the output side disk 17b.

In the case of the illustrated continuously variable transmission apparatus, a base end section (i.e., the left end section in FIG. 1) of the input shaft 1a is coupled to an unillustrated crank shaft of an engine by way of a drive shaft 60. By means of the crank shaft, the input shaft 1a is rotatably driven. A hydraulic pressing apparatus is used as a pressing apparatus 6a to be used for applying appropriate surface pressure to rolling contact sections (traction sections) between the input side surfaces 3, 3 of the input side disks 2a, 2b, the output side surfaces 18, 18 of the output side disk 17b and the circumferential surfaces 21, 21 of the power rollers 20, 20. Pressure oil is freely supplied to the pressing apparatus 6a and hydraulic actuators 79, 79 to be used for displacing the power rollers 20, 20 for changing speed, from a pressure source of a gear pump or the like. Pressure oil is freely supplied to a hydraulic cylinder in order to disconnect or connect a low-speed clutch 61 and a high-speed clutch 62, which will be described later, from a pressure source of a gear pump or the like.

A base end section (i.e., the left end section in FIGS. 1 and 2) of a hollow rotary shaft 32a is coupled to the output side disk 17b by means of spline engagement. The hollow rotary shaft 32a is inserted into the (one) input side disk 2b that is located at a position distal from the engine (i.e., the right side in FIGS. 1 and 2), thereby enabling extraction of rotational force of the output side disk 17b. Moreover, a first sun gear 63 intended to be used for constituting the first planetary gear mechanism 42 is fixedly provided at a portion of the extremity (i.e., the right side portion in FIGS. 1 and 2) of the hollow rotary shaft 32a which protrudes from the outside surface of the input side disk 2b.

A first carrier 64 is provided so as to bridge the projecting portion of the hollow rotary shaft 32a and the input side disk 2b at the extremity section (i.e., the right end in FIGS. 1 and 2) of the input shaft 1a, thereby causing the input side disk 2b to rotate synchronous with the input shaft 1a. The first carrier 64 has three support plates 65a to 65c which assume the shape of a disk and are axially spaced from and arranged concentrically with each other. A cylindrical support cylinder section 66 is fixedly provided on an inner periphery of the support section 65b arranged at an axially intermediate position in the three support plates 65a to 65c. The support cylinder section 66 is coupled to the extremity section of the input shaft 1a through spline engagement. Further, an extremity edge (i.e., the right edge in FIG. 1) of the support cylinder section 66 is suppressed by a nut 67, to thus fix the support cylinder section 66 to the input shaft 1a.

Figure 4A:
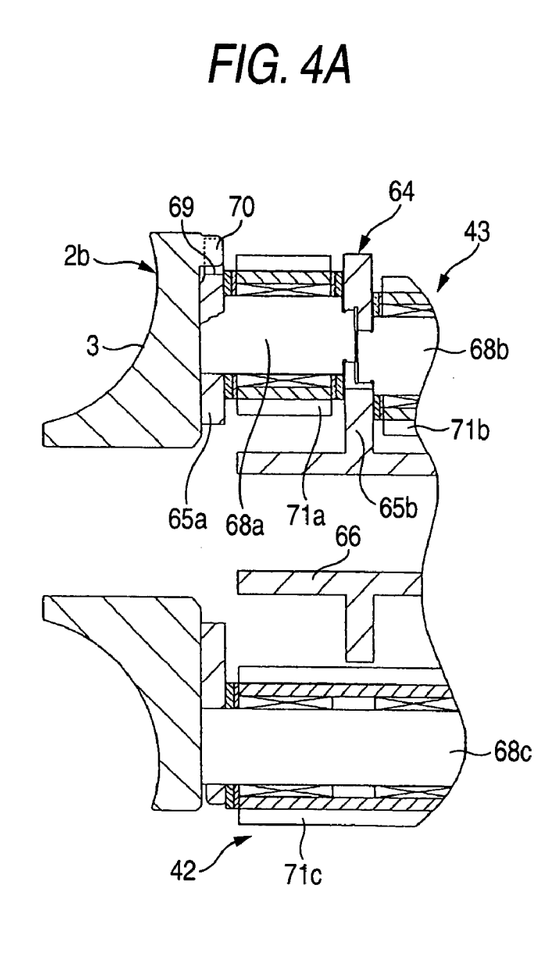
FIG. 4A is an enlarged view of the structure of the continuously variable transmission apparatus of the present invention shown in FIG. 1B.

In contrast, the support plates 65a, 65c, which are located on the respective ends in the axial direction, are fixed to the intermediate support plate 65b by means of planetary shafts 68a, 68b and directly coupled together by means of a planetary shaft 68c. Specifically, one-end sections of the planetary shafts 68a (i.e., the right end section in FIGS. 1 and 4) are fixedly fitted to positions (in general, three to four positions) spaced in a periphery direction at uniform intervals on one side surface of the intermediate support plate 65b opposing the input side disk 2b. The support plate 65a (i.e., the left side in FIGS. 1, 2, and 4) is fixedly fitted to the other end sections (i.e., the left end sections in FIGS. 1 and 4) of the respective planetary shafts 68a. One end sections of the planetary shafts 68b (i.e., the left end section in FIGS. 1 and 4) are fixedly fitted to positions (in general, three to four positions) spaced in a periphery direction at uniform intervals on one side surface of the intermediate support plate 65b opposing the input side disk 2a. The other support plate 65c (the right side in FIG. 1) is fixedly fitted to the other end sections of the respective planetary shafts 68b (i.e., the right end sections in FIG. 1). Both end sections of the remaining planetary shaft 68c are fixedly fitted to positions closer to the outside diameter than to the positions of the support plates 65c and 64a (i.e., three to four locations in general) which are circumferentially spaced at uniform intervals. A portion of the intermediate support section 65b aligned with the remaining axle 68c and the surroundings of that portion are cut away. In order to transmit large torque and to enhance rigidity and strength of the first carrier 64, the support plates 65a to 65c are coupled together by means of the respective planetary shafts 68a to 68c and additional support sections.

Figure 5:
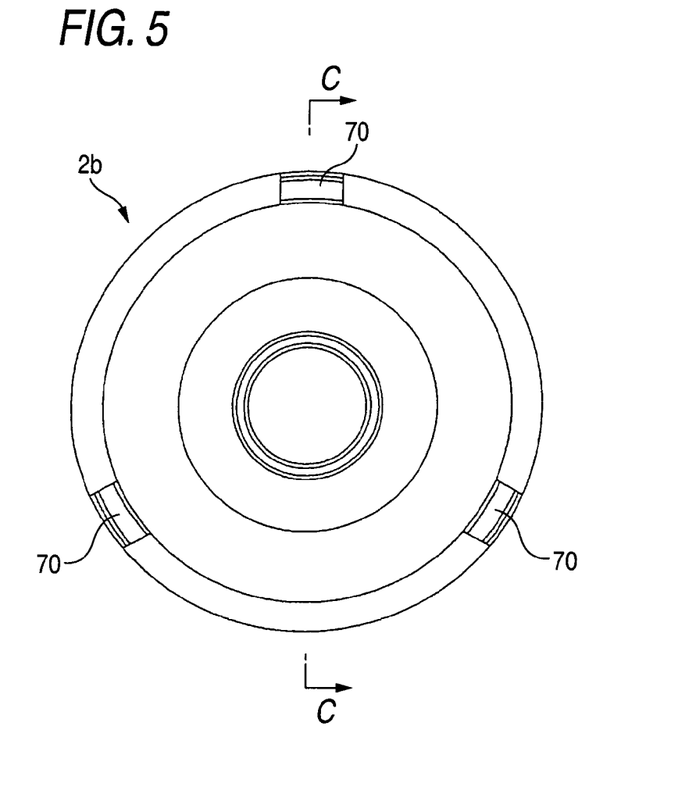
FIG. 5 is a view of an input side disk when viewed in the right in FIG. 4.
Figure 6:
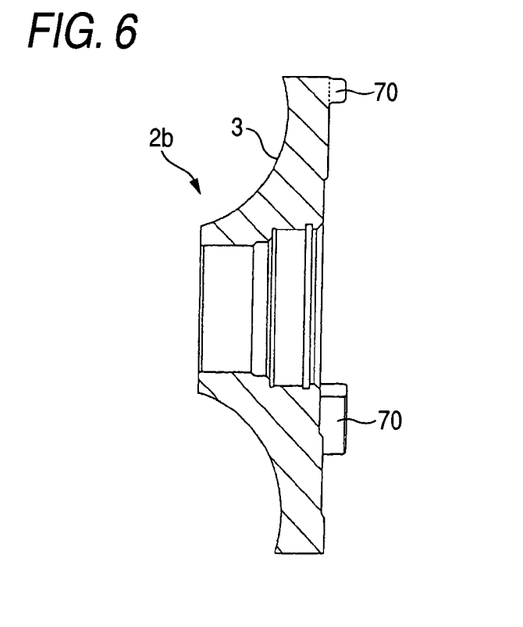
FIG. 6 is a cross-sectional view taken along line C—C shown in FIG. 5.
Figure 7A:
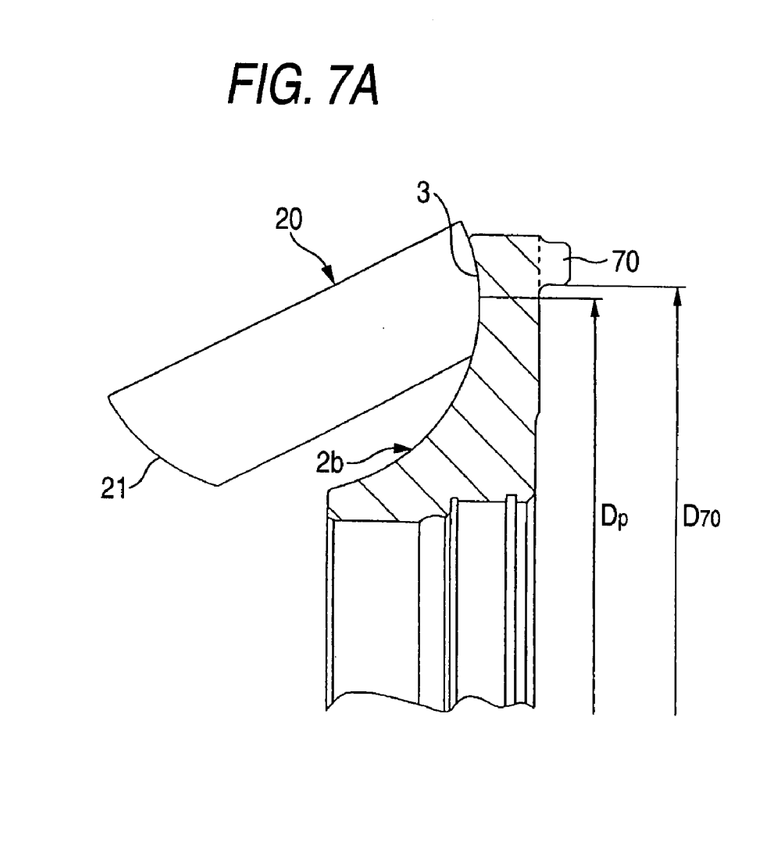
FIG. 7A is a partially-omitted cross-sectional view of the structure of the continuously variable transmission apparatus of the present invention along line D—D shown in FIG. 1.

Notches 69 formed in a plurality of areas (three areas in the embodiment) on the outer peripheral edge of the support plate 65a, the areas being spaced at uniform intervals, and a plurality of protuberance sections 70, 70 (three protuberance sections in the embodiment) are engaged with each other. As shown in FIGS. 5 and 6, the protuberance sections 70, 70 are formed at positions on the outer side surface of the input side disk 2b (i.e., the right side surface in FIGS. 1, 2, 4, 6, and 7), the positions being circumferentially spaced at uniform intervals. More specifically, as shown in FIG. 7A, a rolling contact section between the input side surface 3 serving as an inner surface of the input side disk 2b and the circumferential surface 21 of the power roller 20 is a traction section. When the traction section is located at a position on the input side surface 3 close to the outside diameter (i.e., in the state of maximum acceleration of the toroidal type continuously variable transmission 25a), the projections 70, 70 are provided projectingly at positions closer to the outside diameter than to a diameter Dp of a pitch circle of the traction section. The protuberance sections 70, 70 are engaged with the notches 69 formed in the support plate 65a without rattle in at least the circumferential direction. As a result, power is freely transmitted between the first carrier 64 and the input side disk 2b.

Planetary gears 71a to 71c are rotatably supported on the respective planetary shafts 68a to 68c provided on the first carrier 64, thereby constituting the first and second planetary gear mechanisms 42, 43 of double pinion type. Moreover, a first ring gear 72 is rotatably supported around half the area of the first carrier 64 (i.e., a right half of the first carrier in FIGS. 1 and 2). Of the planetary gears 71a to 71c, the planetary gear 71a which is disposed close to the toroidal-type continuously variable transmission 25a (i.e. the left side area in FIGS. 1 and 2) and inside in the radial direction of the first carrier 64 is engaged with the first sun gear 63. The planetary gear 71b which is disposed at a position distal from the toroidal-type continuously variable transmission 25a (i.e., the right side portion in FIGS. 1 and 2) and inside in the radial direction of the first carrier 64 is engaged with the second sun gear 73 fixed on the base end section (a left end section in FIG. 1) of the transmission shaft 45. The remaining planetary gear 71c disposed outside in the radial direction of the first carrier 64 is made larger in axial dimension than the planetary gears 71a, 71b disposed inside and is engaged with the planetary gears 71a, 71b. Moreover, the remaining planetary gear 71c is engaged with the first ring gear 72. Instead of causing the planetary gears located close to the outside in the radial direction to be independent of each other with in the first and second planetary gear mechanisms 42, 43, there may also be employed a structure in which a ring gear having a larger width is engaged with the planetary gears.

A second carrier 74 to be used for constituting the third planetary gear mechanism 44 is fixedly coupled to the base end section (i.e., the left end section in FIG. 1) of the output shaft 38a. The second carrier 74 and the first ring gear 72 are coupled together by way of the low-speed clutch 61. A third sun gear 75 is fixedly provided at an extremity portion of the transmission shaft 45 (i.e., the right end portion in FIGS. 1 and 2). A second ring gear 76 is disposed around the third sun gear 75. The high-speed clutch 62 is provided at an area where the second ring gear 76 and the casing 11 or the like are fixed together. Moreover, a plurality of sets of planetary gears 77a, 77b interposed between the second ring gear 76 and the third sun gear 75 are rotatably supported by the second carrier 74. These planetary gears 77a, 77b engage with each other, and the planetary gear 77a disposed inside in the radial direction of the second carrier 74 is engaged with the third sun gear 75, and the planetary gear 77b disposed outside is engaged with the second ring gear 76.

In the case of the continuously variable transmission apparatus of the present embodiment having the foregoing construction, power is transmitted from the input shaft 1*a* to the integral output side disk 17*b* by way of the pair of input side disks 2*a*, 2*b* and the power rollers 20, 20. The thus-transmitted power is extracted by way of the hollow rotary shaft 32*a*. In the low-speed mode in which the low-speed clutch 61 is connected and the high-speed clutch 62 is disconnected, the rotational speed of the output shaft 38*a* can be switched between forward rotation and rearward rotation with a stop therebetween while the rotational speed of the input shaft 1*a* is kept constant, by means of changing the transmission ratio of the toroidal-type continuously variable transmission 25*a*. Specifically, in this low-speed mode, a difference between the first carrier 64 rotating forward along with the input shaft 1*a* and the first sun gear 63 rotating in reverse along with the hollow rotary shaft 32*a* is transmitted from the first ring gear 72 to the output shaft 38*a* by way of the low-speed clutch 61 and the second carrier 74. In this state, the output shaft 38*a* is stopped by means of changing the transmission ratio of the toroidal-type continuously variable transmission 25*a* to a predetermined value. In addition, the output shaft 38*a* is also rotated in a direction in which the automobile is to run rearward, by means of changing the transmission ratio of the toroidal-type continuously variable transmission 25*a* toward acceleration from the predetermined value. In contrast, the output shaft 38*a* is rotated in a direction in which the automobile is to run forward, by means of changing the transmission ratio of the toroidal-type continuously variable transmission 25*a* toward deceleration from the predetermined value.

Further, in the high-speed mode in which the low-speed clutch 61 is disconnected and the high-speed clutch 62 is connected, the output shaft 38*a* is rotated in a direction in which the automobile is to run forward. Specifically, in this high-speed mode, rotation of the planetary gear 71*a* of the first planetary gear mechanism 42, the planetary gear rotating in accordance with a difference in rotational speed between the first carrier 64, which rotates forward along with the input shaft 1*a*, and the first sun gear 63, which rotates reversely along with the hollow rotary shaft 32*a* and the first carrier 64, is transmitted to the planetary gear 71*b* of the second planetary gear mechanism 43 by way of another planetary gear 71*c*. As a result, the transmission shaft 45 is rotated by way of the second sun gear 73. The second carrier 74 and the output shaft 38*a* coupled with the second carrier 74 rotate forward by means of engagement between the third sun gear 75 provided at the extremity of the transmission shaft 45, the second ring gear 76 constituting the third planetary gear mechanism 44 along with the third sun gear 75, and the planetary gears 77*a*, 77*b*. In this state, as the transmission ratio of the toroidal-type continuously variable transmission 25*a* is changed toward acceleration, the rotational speed of the output shaft 38*a* can be increased.

Further, in the case of the continuously variable transmission apparatus of the present embodiment, transmission of power between the input side disk 2*b* and the first carrier 64 can be performed without fail while an attempt is realized to achieve a reduction in size and weight. Specifically, in order to perform power transmission, the plurality protuberance sections 70, 70 projectingly provided on the outer side surface of the input side disk 2*b* are formed along an outer edge of the outer side surface at positions closer to the outside in the radial direction than to the pitch diameter Dp of the traction section. The notches 69 formed in the outer edge of the support plate 65*a* constituting the carrier 64 are engaged with the protuberance sections 70, 70. Portions constituting the notches 69 are provided at positions more toward the outside in the radial direction than to the areas where the edge sections of the respective planetary shafts 68*a* are fitted. Therefore, as shown in FIG. 4A, interference between the protuberance sections 70, 70 and the end sections of the respective planetary shafts 68*a* does not arise even when the thickness of the support plate 65*a* is not made larger than necessary to ensure strength.

Figure 4B:
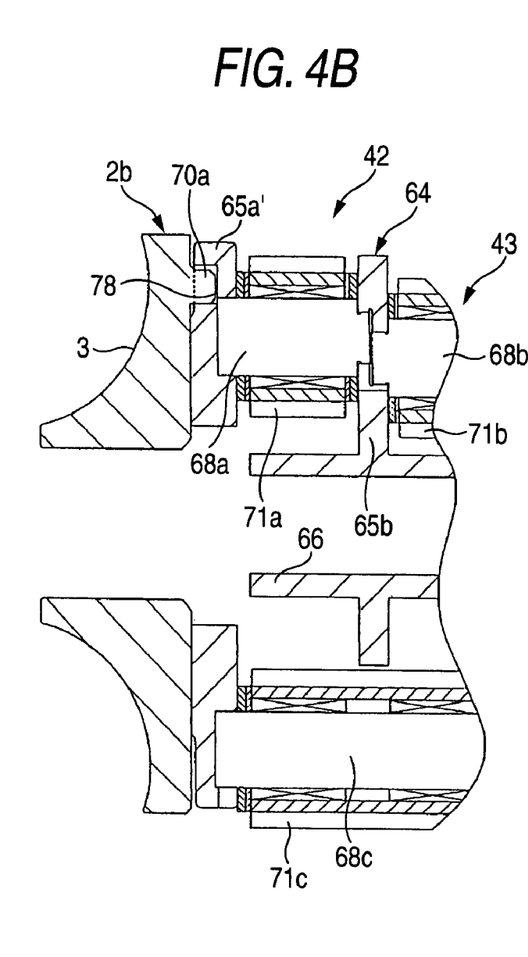
FIG. 4B is an enlarged view of another conceivable structure of the continuously variable transmission apparatus shown in FIG. 1B.

For this reason, an attempt can be realized to make the transmission compact and lightweight by means of rendering the support plate 65*a* thin. In the case of a structure, wherein the plurality of protuberance sections projectingly provided on the half of the external surface of the input side disk closer to the outside diameter than to the center of the external surface are engaged with the extremity sections of the transmission projections provided on the transmission members which transmit torque to the input side disk, thereby enabling transmission of torque between the input side disk and the transmission member, the protuberance sections 70*a* are placed at positions radially inside about 10 mm or thereabouts from the outer edge of the input side disk 2*b*, as shown in FIG. 4B. In order to prevent occurrence of interference between the protuberance sections 70*a* and the planetary shafts 68*a*, there arise a necessity for increasing the thickness of a support plate 65*a*' and forming, in one surface of the support plate 65*a*', recessed sections 78 to be used for engaging the protuberance sections 70*a*. For this reason, in the case of the foregoing structure, difficulty is encountered in making an attempt to achieve a reduction in size and weight by making the support plate 65*a*' thin. Machining operations required to make the recessed sections 78 are more troublesome than the operations for producing the notches, thus adding to costs. According to the structure of the present invention, the diameter of the portion (i.e., the engagement section between the protuberance sections 70, 70 and the notches 69) of the transmission to be used for transmitting torque is large. Hence, when torque of same magnitude is transmitted, the force acting on the engagement section can be suppressed to a level of force smaller than that required in the foregoing structure. Even in this regard, the structure of the present invention is advantageous over the previously-described structure.

Figure 7B:
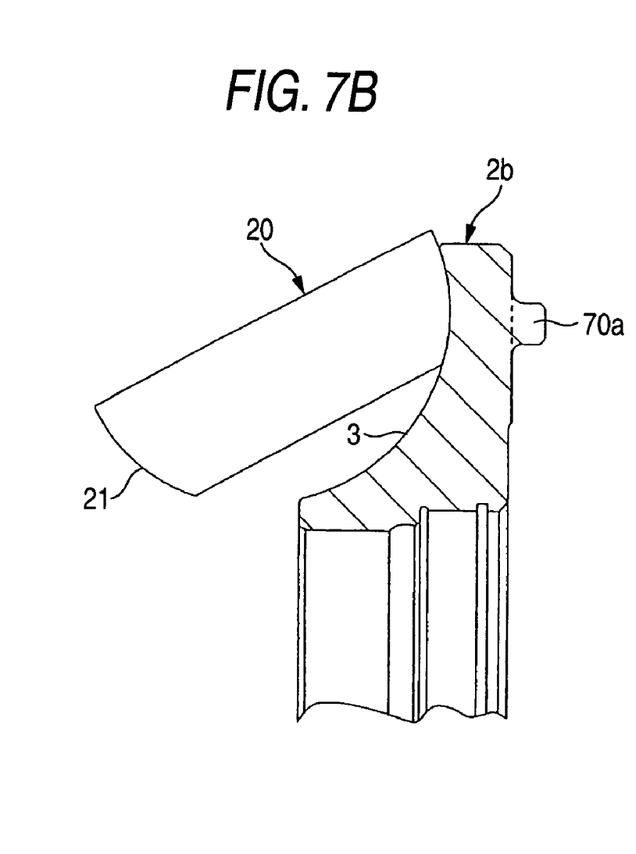
FIG. 7B is a partially-omitted cross-sectional view of another conceivable structure of the continuously variable transmission apparatus shown in FIG. 1B.

Moreover, in the case of the present invention, the protuberance sections 70, 70 are provided at positions radially outside the pitch circle diameter Dp of the traction section, and hence the durability of the input side disk 2*b* can also be improved. The reason for this is that a displacement arises between a portion of the input side disk 2*b* where stress is exerted in association with transmission of torque between the input side disk 2*b* and the first carrier 64 and a portion of the input side disk 2*b* where stress is exerted in association with transmission of torque between the input side disk 2*b* and the power rollers 20. Specifically, shearing stress acts on the portions of the input side disk 2*b* where the protuberance sections 70, 70 are formed in association with transmission of torque between the input side disk 2*b* and the first carrier 64. Further, when torque is transmitted between the power rollers 20 and the input side disk 2*b*, compression and shearing stress act on the traction section. In the case of the present invention, the radial positions of the protuberance sections 70, 70 are limited in the manner mentioned previously. Hence, as shown in FIG. 7A, in association with transmission of two types of torque, the stress acts on different locations on the input side disk 2*b* (i.e., not an overlapping location). Therefore, an attempt can be easily realized to improve fatigue life of metal constituting the input side disk 2*b*. In contrast, in the case of the conventional structure, wherein the plurality of protuberance sections projectingly provided on the half of the external surface of the input side disk closer to the outside diameter than to the center of the external surface are engaged with the extremity sections of the transmission projections provided on the transmission members which transmit torque to the input side disk, thereby enabling transmission of torque between the input side disk and the transmission member, the stress acts on an overlapping position on the input side disk 2b in association with transmission of two types of torque, as shown in FIG. 7B. For this reason, difficulty is encountered in realizing an attempt to improve the fatigue life of the metal constituting the input side disk 2b. Even in this aspect, the structure of the present invention is advantageous over the foregoing structure.

When the input side surface 3, which is an inner surface of the input side disk 2, is finished, an unillustrated backup plate is abutted against the inner-diameter portions of the respective protuberance sections 70, 70 on the outer side surface of the input side disk 2b. A diameter D70 of the inner-diameter portions (i.e., inscribing circles of the respective protuberance sections 70, 70) of the protuberance sections 70, 70 is larger than the pitch circle diameter Dp of the traction section (D70>Dp). Hence, the support strength of the portion of the input side surface 3 which can come into contact with the circumferential surface 21 of the power roller 20 can be sufficiently ensured. For this reason, even in view of ensuring the shape and dimensional accuracy of the input side surface 3, the structure of the invention is advantageous over the previously-described structure. Particularly, if the respective protuberance sections 70, 70 are provided at positions radially outside the circumscribing circle of the contact ellipse existing in the traction section, the structure of the invention becomes advantageous in terms of ensuring precision of the input side surface 3 and ensuring fatigue life.

The present invention is explained in reference to a half-toroidal-type continuously variable transmission. However, the present invention may have applicability to full-toroidal-type continuously variable transmission.

The present invention is configured and operates in the manner as mentioned previously. Hence there can be realized a continuously variable transmission apparatus capable of transmitting large power, having superior durability, and being compact and lightweight.

What is claimed is:

1. A continuously variable transmission apparatus coupled to a drive source comprising: an input shaft rotatably driven by the drive source; an output shaft for extracting power derived from rotation of the input shaft; and a toroidal-type continuously variable transmission and a planetary gear mechanism disposed between the input shaft and the output shaft, wherein the toroidal-type continuously variable transmission has:
a pair of input side disks, each having inner and outer side surfaces and rotating together with the input shaft;
an output side disk having side surfaces, the side surface being disposed concentrically with the respective input side disks around an intermediate section of the input shaft and being opposite to the inner side surfaces of the respective input side disks, and the output side disk being rotatable independently of the input side disks;
a trunnion interposed between the input side disk and the output side disk and swinging around an axle twisted with respect to center axles of the disks;
a support shaft protruding from an inner side surface of the trunnion; and
a power roller interposed between the input side disk and the output side disk while being rotatably supported by the support shaft; and
the planetary gear mechanism has:
a sun gear;
a ring gear disposed around the sun gear;
a carrier supported concentrically with the sun gear and supported on one end section of the input shaft; and
a planetary gear interposed between the sun gear and the ring gear, rotatably supported by the carrier and engaged with the sun gear and the ring gear; and
wherein a plurality of projections are projected from a portion of the outer side surface of the one input side disk and provided at positions closer to the outside diameter than to the diameter of a pitch circle of a traction section, the traction section being a rolling contact section between the inner side surface of the input side disk and a circumferential surface of the power roller and located areas close to the outermost diameter of an inside surface of the input side disk,
a plurality of engagement sections formed in a part of the carrier, and
transmission of power between the carrier and the one input side disk is carried out by coupling the plurality of projections with the plurality of engagement sections.

2. A continuously variable transmission apparatus according to claim 1, wherein the plurality of projections are provided radially outside a circumscribed circle of a contact oval existing in the traction section.

3. A continuously variable transmission apparatus according to claim 1, wherein the continuously variable transmission apparatus achieves the state of an infinite transmission ratio by stopping the output shaft while the input shaft is rotated.

* * * * *